United States Patent
Morris et al.

(10) Patent No.: US 10,343,090 B2
(45) Date of Patent: Jul. 9, 2019

(54) FILTER ELEMENT LOCKING MECHANISM FOR CLEAN SERVICE

(71) Applicant: Caterpillar Inc., Peoria, IL (US)

(72) Inventors: Bryant Alan Morris, Dunlap, IL (US); Jeffrey R. Ries, Metamora, IL (US); Timothy J. Bennett, Bloomington, IL (US)

(73) Assignee: Caterpillar Inc., Deerfield, IL (US)

( * ) Notice: Subject to any disclaimer, the term of this patent is extended or adjusted under 35 U.S.C. 154(b) by 443 days.

(21) Appl. No.: 15/258,280

(22) Filed: Sep. 7, 2016

(65) Prior Publication Data

US 2018/0065066 A1    Mar. 8, 2018

(51) Int. Cl.
| | |
|---|---|
| B01D 29/96 | (2006.01) |
| B01D 29/11 | (2006.01) |
| B01D 35/00 | (2006.01) |
| B01D 35/147 | (2006.01) |
| B01D 35/30 | (2006.01) |
| B01D 29/13 | (2006.01) |

(52) U.S. Cl.
CPC ............ B01D 29/96 (2013.01); B01D 29/114 (2013.01); B01D 29/13 (2013.01); B01D 35/005 (2013.01); B01D 35/147 (2013.01); B01D 35/306 (2013.01); B01D 2201/291 (2013.01); B01D 2201/305 (2013.01); B01D 2201/40 (2013.01); B01D 2201/4015 (2013.01)

(58) Field of Classification Search
CPC ...... B01D 29/96; B01D 29/13; B01D 35/306; B01D 35/147; B01D 29/114; B01D 35/005; B01D 2201/4015; B01D 2201/305; B01D 2201/291; B01D 2201/40

USPC .......................................... 210/232, 440–444
See application file for complete search history.

(56) References Cited

U.S. PATENT DOCUMENTS

| | | |
|---|---|---|
| 5,770,054 A | 6/1998 | Ardes |
| 6,481,580 B1 | 11/2002 | Amstutz et al. |
| 6,488,845 B1 | 12/2002 | Neufeld et al. |
| 6,837,993 B2 | 1/2005 | Clausen et al. |

(Continued)

FOREIGN PATENT DOCUMENTS

WO           0216004           2/2002

*Primary Examiner* — Madeline Gonzalez
(74) *Attorney, Agent, or Firm* — Finnegan, Henderson, Farabow, Garrett & Dunner, LLP

(57) ABSTRACT

A filter element may include a tubular element, first and second end caps, each associated with an opposite end of the tubular element, filter media positioned around the tubular element and between the first and second end caps, a biasing element associated with the tubular element, and a retainer element positioned at a first end of the tubular element. The retainer element may include a retainer aperture including a central circular portion and two opposite lateral slots extending from opposite sides of the central circular portion, and two arcuate shoulder segments extending between opposite sides of the two opposite lateral slots. A full tab may extend a first axial distance from a bottom surface of one of the two arcuate shoulder segments at a circumferential position in between the two opposite lateral slots, and a partial tab may extend a second axial distance less than the first axial distance from a bottom surface of the other of the two arcuate shoulder segments at a circumferential position on an opposite side of the lateral slots from the full tab.

20 Claims, 12 Drawing Sheets

(56) References Cited

U.S. PATENT DOCUMENTS

| | | | |
|---|---|---|---|
| RE38,917 E | | 12/2005 | Ardes |
| 7,204,370 B2 | | 4/2007 | Calusen et al. |
| 8,157,107 B2 | | 4/2012 | Weindorf |
| 8,168,066 B2 | | 5/2012 | Wieczorek et al. |
| 8,286,804 B2 | | 10/2012 | Weindorf |
| 8,298,409 B2 | | 10/2012 | Pflueger et al. |
| 8,440,081 B2 | | 5/2013 | Wieczorek |
| 8,613,854 B2 | * | 12/2013 | Jainek ................ B01D 35/147 210/136 |
| 8,877,053 B2 | | 11/2014 | Hacker |
| 2006/0207948 A1 | | 9/2006 | Hacker et al. |
| 2007/0241040 A1 | | 10/2007 | Kott et al. |

* cited by examiner

FILTER ELEMENT LOCKING MECHANISM FOR CLEAN SERVICE

TECHNICAL FIELD

The present disclosure relates to a filter element locking mechanism, and more particularly, to a filter element locking mechanism for clean service.

BACKGROUND

Engines including compression-ignition engines, spark-ignition engines, gasoline engines, gaseous fuel-powered engines, and other internal combustion engines, may operate more effectively and with greater service lives with oil from which contaminates have been removed. In addition, engines may operate more effectively with fuel from which contaminates have been removed prior to the fuel reaching a fuel injection system or combustion chamber of the engine. As a result, engines may be provided with one or more fluid filtration systems to remove contaminates from the oil and/or fuel.

Filter systems often include a filter element having filter media for removing the contaminates from fluid. The filter media may become more resistant to flow of the fluid through the filter media as trapped contaminates build up on or in the filter media. This results in the need to replace or clean the filter media to rehabilitate the effectiveness of the filter system. In addition, before the filter media is replaced or cleaned, it is desirable for the filter system to be capable of continuing to allow fluid to circulate in the fluid system in order for the engine to temporarily operate.

When the filter media of conventional filter systems is removed for replacement or cleaning, the act of removing the filter element, filter media, and any associated parts from the fluid system may generally result in spillage of some of the fluid as the filter media is removed. For example, some filter systems require draining of a filter canister when removing the filter element. This may result in spillage, for example, if service technicians are not careful to ensure that the drained fluid is captured by appropriate containers. Particularly when the fluid systems contain petroleum-based products such as oil or fuel, it is undesirable to expose the environment to such spillage. In addition, replacing or cleaning a filter element may be particularly unpleasant for service technicians when the fluid spills from the filter system onto their hands and clothing. As a result, it may be desirable to provide a filter system that reduces the likelihood of spillage when the filter media is replaced or cleaned, and that enables the coupling and uncoupling of the filter element from a filter housing without the service technician having to touch the filter element.

A filter coupled to a housing is described in U.S. Pat. No. 8,157,107 B2 ("the '107 patent") to Weindorf issued Apr. 17, 2012. Specifically, the '107 patent describes a liquid filter having a filter housing with a drain passage. A filter element including a filter medium is arranged in the filter housing. A filter lid is configured to be connected to the filter housing. The filter lid has a filter bypass valve for bypassing the filter element when a pressure loss that is too high occurs when liquid passes through the filter medium of the filter element. First bayonet connectors are provided on the filter lid, and second bayonet connectors are provided on the filter element for connecting the filter element to the filter lid. A double-concentric seal is arranged on the filter element for closing off the drain passage.

Although the liquid filter of the '107 patent purports to facilitate decoupling of the filter element from the filter lid in a way that can be inexpensively and simply produced, it may still not address one or more of the possible drawbacks set forth above. For example, the double-concentric seal of the '107 patent may be complex and relatively expensive to produce. Furthermore, the arrangement of the '107 patent's liquid filter may result in undesirable spillage when removing the filter element from the filter housing.

The filter element and filter housing assembly disclosed herein may be directed to mitigating or overcoming one or more of the possible drawbacks set forth above.

SUMMARY

According to a first aspect of the present disclosure, a filter element may include a tubular element, first and second end caps, each associated with an opposite end of the tubular element, filter media positioned around the tubular element and between the first and second end caps, a biasing element associated with the tubular element, and a retainer element positioned at a first end of the tubular element. The retainer element may include a retainer aperture including a central circular portion and two opposite lateral slots extending from opposite sides of the central circular portion, and two arcuate shoulder segments extending between opposite sides of the two opposite lateral slots. A full tab may extend a first axial distance from a bottom surface of one of the two arcuate shoulder segments at a circumferential position in between the two opposite lateral slots, and a partial tab may extend a second axial distance less than the first axial distance from a bottom surface of the other of the two arcuate shoulder segments at a circumferential position on an opposite side of the lateral slots from the full tab.

According to a further aspect of the present disclosure, a filter housing assembly may include a filter element, a housing configured to be selectively coupled to and uncoupled from the filter element, and a coupler joined to the housing and configured to alternately couple and uncouple the filter element with the housing by relative movement between the housing and the filter element. The filter element may include a tubular element, first and second end caps, filter media positioned around the tubular element and between the first and second end caps, a biasing element, and a retainer element positioned at a first end of the tubular element. The retainer element may include a retainer aperture configured to receive a portion of the coupler, and the retainer aperture may include a central circular portion and two opposite lateral slots extending from opposite sides of the central circular portion. Two arcuate shoulder segments may extend between opposite sides of the two opposite lateral slots, a full tab may extend a first axial distance from a bottom surface of one of the two arcuate shoulder segments at a circumferential position in between the two opposite lateral slots, and a partial tab may extend a second axial distance less than the first axial distance from a bottom surface of the other of the two arcuate shoulder segments at a circumferential position on an opposite side of the lateral slots from the full tab.

According to yet another aspect of the present disclosure, a filter system may include a housing, a filter element, and a coupler configured to join the housing to the filter element. The filter element may include a retainer element positioned at one axial end of the filter element, and a biasing element axially spaced from the retainer element. The coupler may include a first surface configured to be moved both axially and circumferentially while in contact with the biasing element, and a second surface configured to be biased by the biasing element into engagement with the retainer element in a first position to enable retention of the filter element in the housing. The second surface may be configured to be moved axially and circumferentially out of engagement with the retainer element to a second position at which the coupler may be released from engagement with the retainer element.

DETAILED DESCRIPTION

FIGS. 1-14 illustrate exemplary embodiments of a filter system 10 and related parts. Filter system 10 may be used to filter fluids such as, for example, fuel, lubricants, coolants, and hydraulic fluid used by machines. For example, filter system 10 may be provided for internal combustion engines or hydraulic systems for use in machines, such as, for example, any type of ground-borne vehicle, such as an automobile, a truck, an agricultural vehicle, and/or a construction vehicle, such as, for example, a skid-steer loader, a wheel loader, a dozer, a track-type tractor, an excavator, a grader, an on-highway truck, an off-highway truck, and/or any other vehicle type known to a person skilled in the art. In addition, internal combustion engines may supply power to any stationary machines, such as, for example, a genset for generating electric power or a pump for pumping a fluid such as water, natural gas, or petroleum. The internal combustion engine may be, for example, a spark-ignition engine or a compression-ignition engine. Other types of engines may include, for example, rotary engines, gas turbine engines, and/or engines powered by gasoline, diesel fuel, bio-diesel, ethanol, methanol, and combinations thereof.

Figure 1:
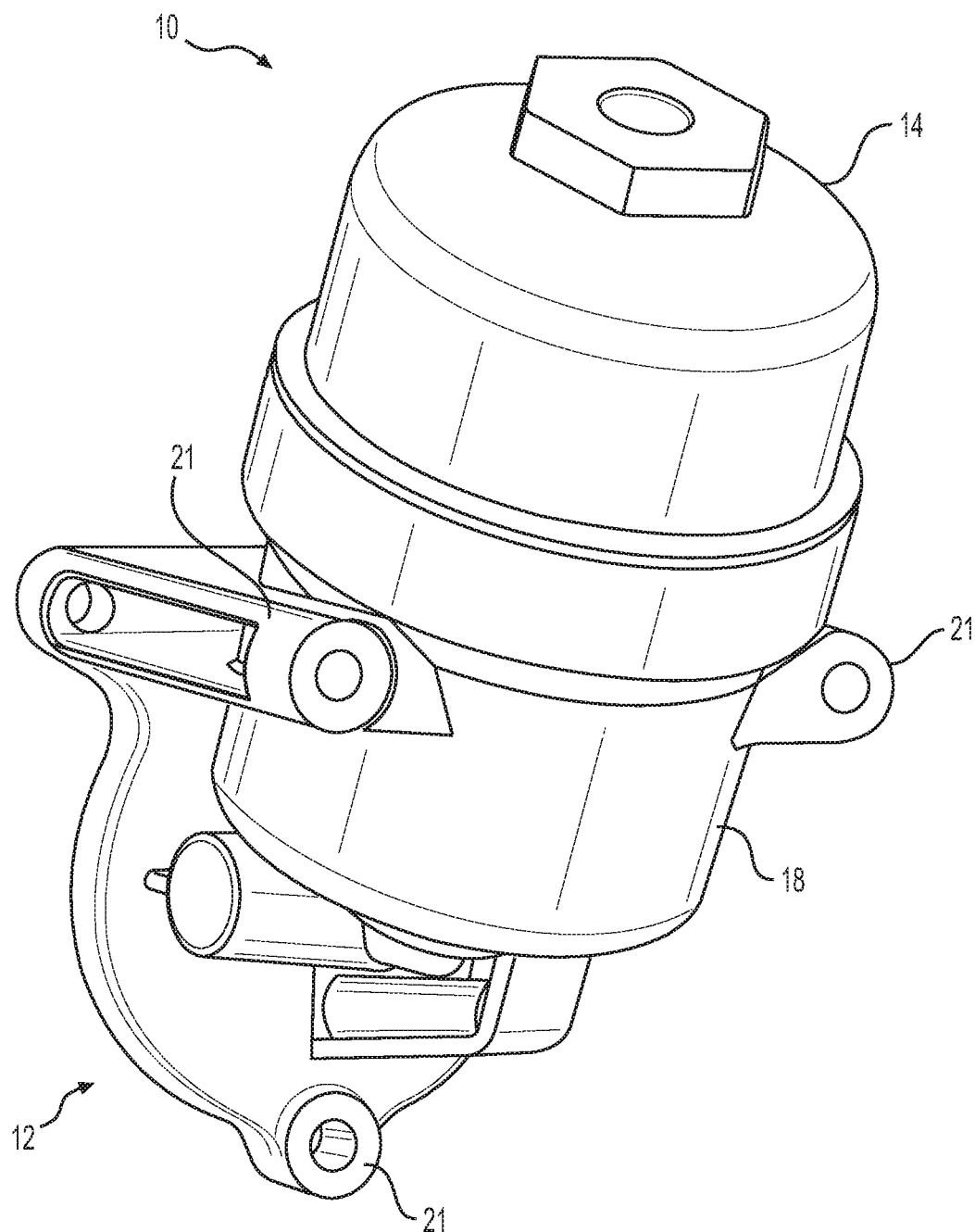
FIG. 1 is a perspective view of an exemplary embodiment of a filter system.
Figure 2:
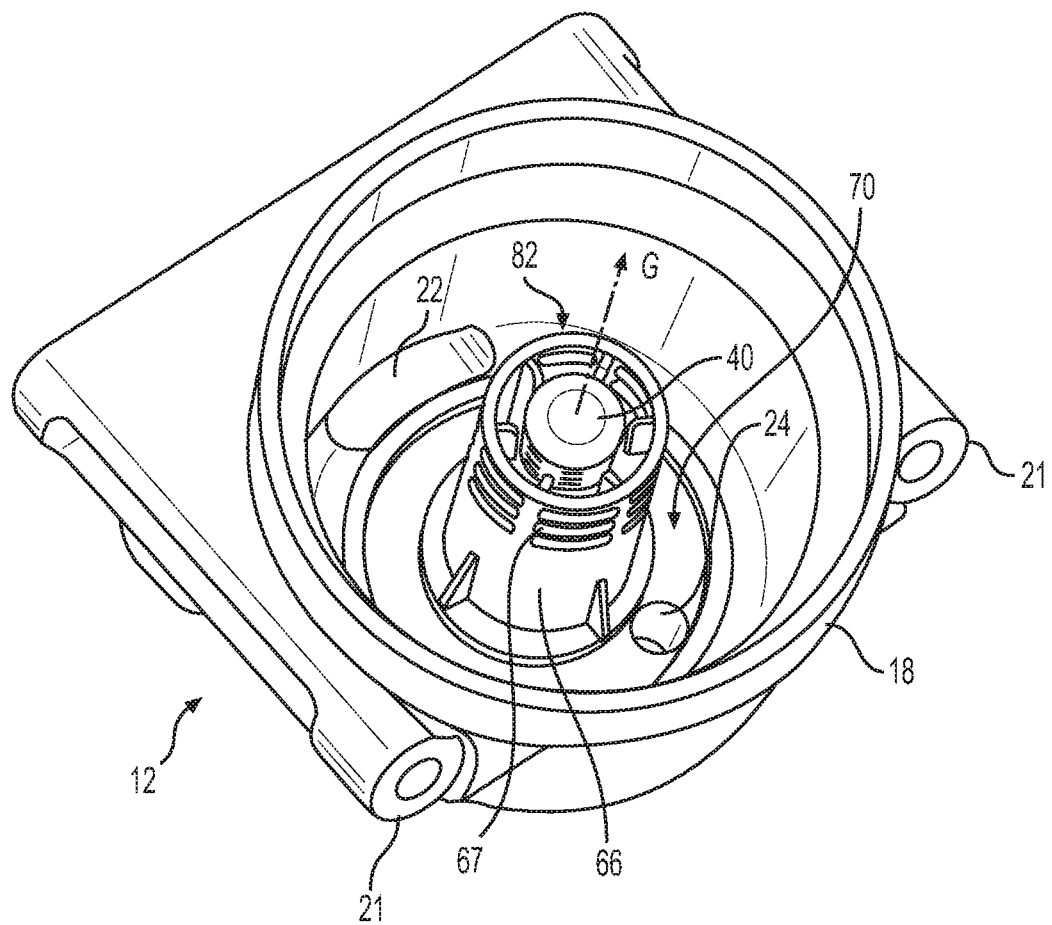
FIG. 2 is a perspective view of a portion of the exemplary embodiment shown in FIG. 1.
Figure 3:
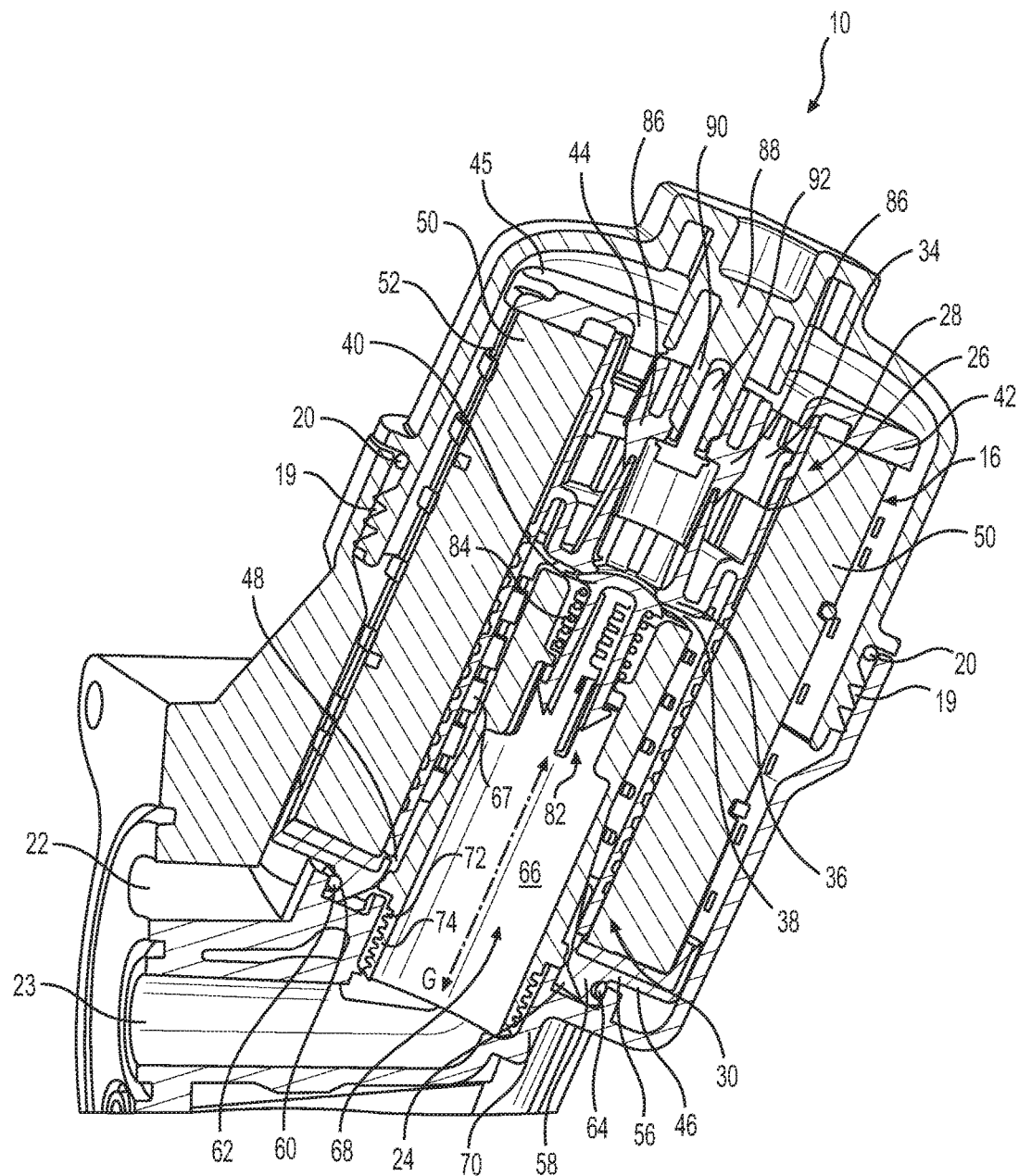
FIG. 3 is a side section view of an exemplary embodiment of a filter system including a filter housing assembly and a filter element within the filter housing assembly.

Exemplary filter system 10 shown in FIGS. 1-9 includes a filter base 12 configured to couple filter system 10 to a machine (e.g., to an engine of a machine), a first housing 14 configured to be selectively coupled to a filter element 16, and a second housing 18 associated with filter base 12. In the exemplary embodiments shown, first housing 14 and second housing 18 are configured to be coupled to one another and contain filter element 16. For example, first housing 14 and second housing 18 may include complimentary threaded portions 19 configured to engage one another and secure first and second housings 14 and 18 to one another, for example, as shown in FIG. 3. Filter system 10 may also include a seal member 20 (e.g., an O-ring seal) associated with threaded portions 19 to provide a fluid seal when first and second housings 14 and 18 are secured to one another.

Exemplary filter base 12 includes bosses 21 (see, e.g., FIG. 1) configured to receive fasteners (not shown) such as bolts for coupling filter base 12 to a machine. As shown in FIG. 2, exemplary second housing 18 includes an inlet port 22 configured to receive fluid from a fluid system of the machine and provide flow communication into filter system 10. Exemplary second housing 18 also includes an outlet port 23 (see FIG. 3) configured to return filtered fluid to the fluid system of the machine, providing flow communication between filter system 10 and the fluid system. Exemplary second housing 18 also includes a drain passage 24 (see FIGS. 2-4) configured to return fluid in filter system 10 to the fluid system when filter element 16 is separated from second housing 18, as explained in more detail below.

Figure 4:
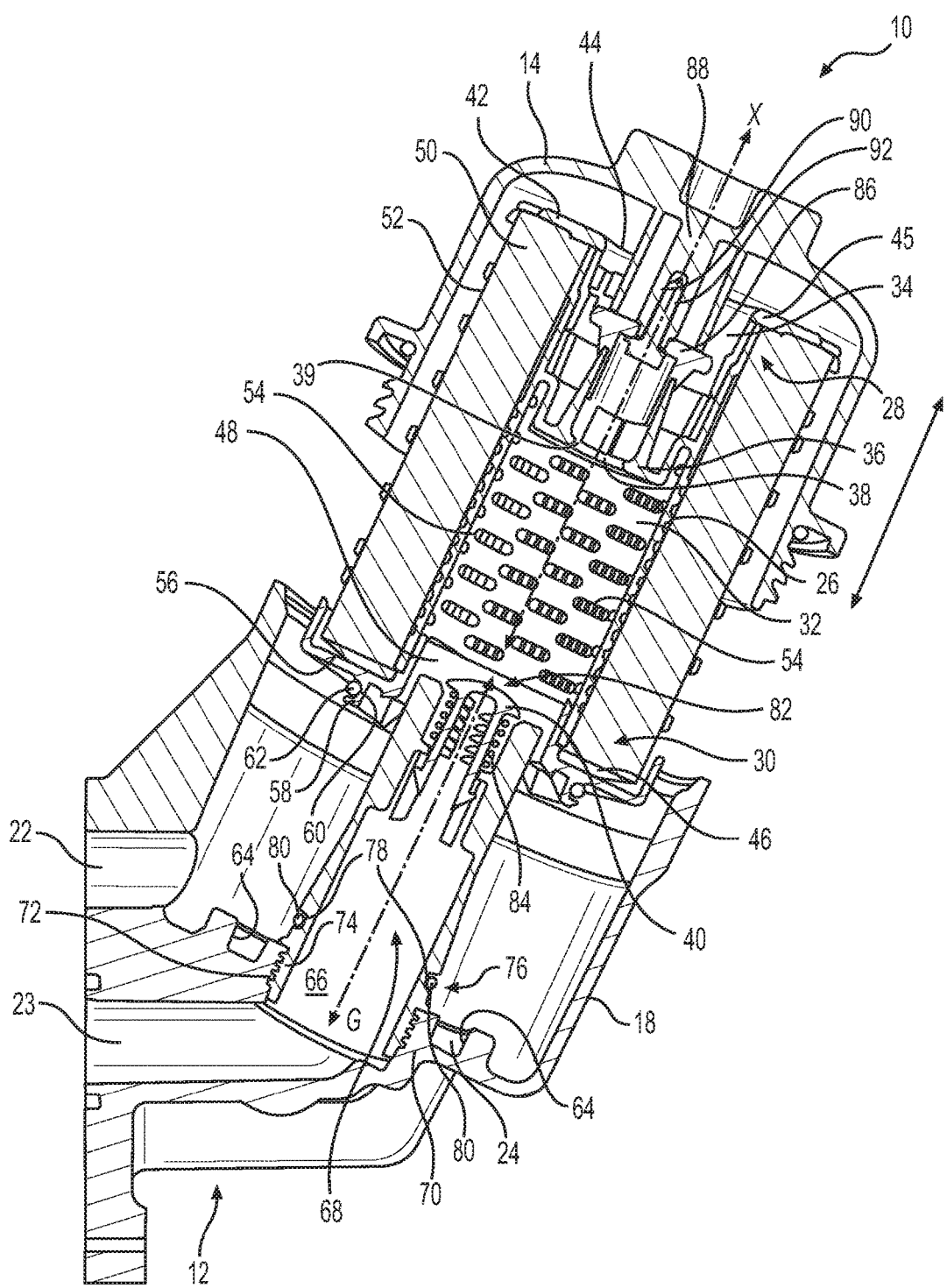
FIG. 4 is a side section view of the exemplary embodiment shown in FIG. 3 with a first housing of the filter system being separated from a second housing of the filter system.
Figure 8:
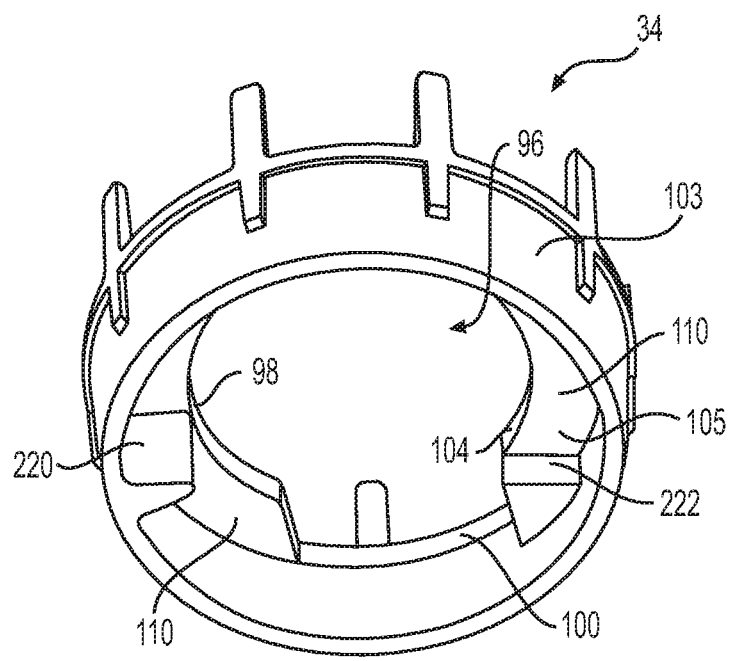
FIG. 8 is a perspective partial section view of an exemplary embodiment of a retainer element of the exemplary filter system shown in FIGS. 3-5.
Figure 9:
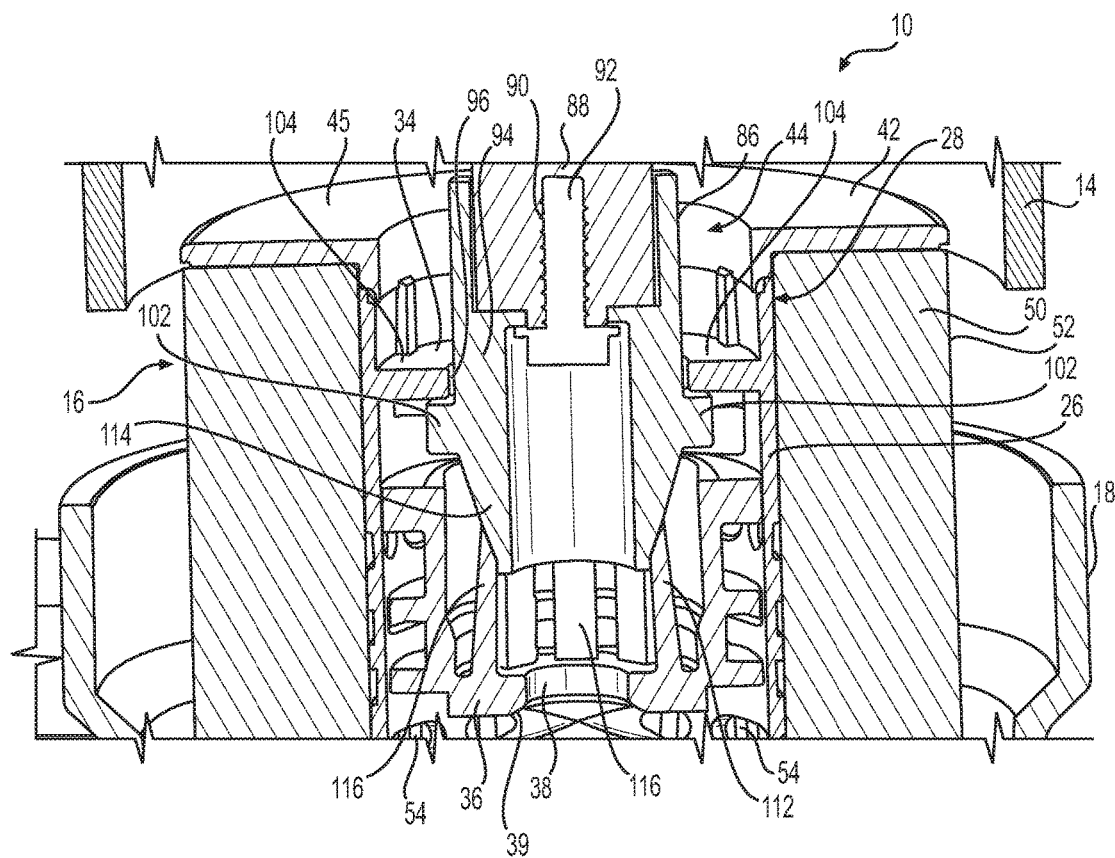
FIG. 9 is a perspective detail section view of a portion of the first housing and filter element being assembled into the second housing of the exemplary filter system shown in FIGS. 3-5.
Figure 10:
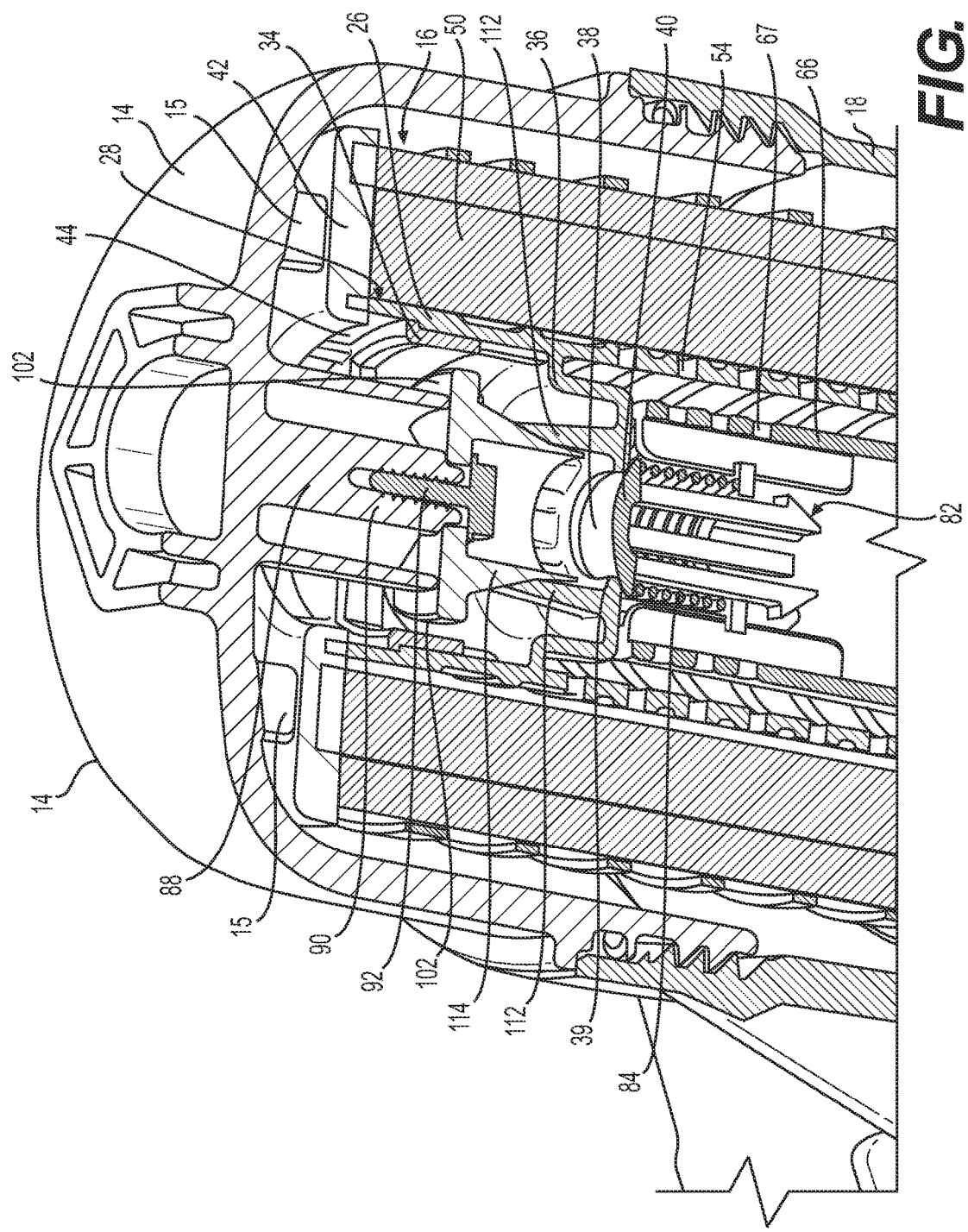
FIG. 10 is an enlarged perspective section view of a housing and filter element of FIG. 3 in a first relative position.
Figure 11:
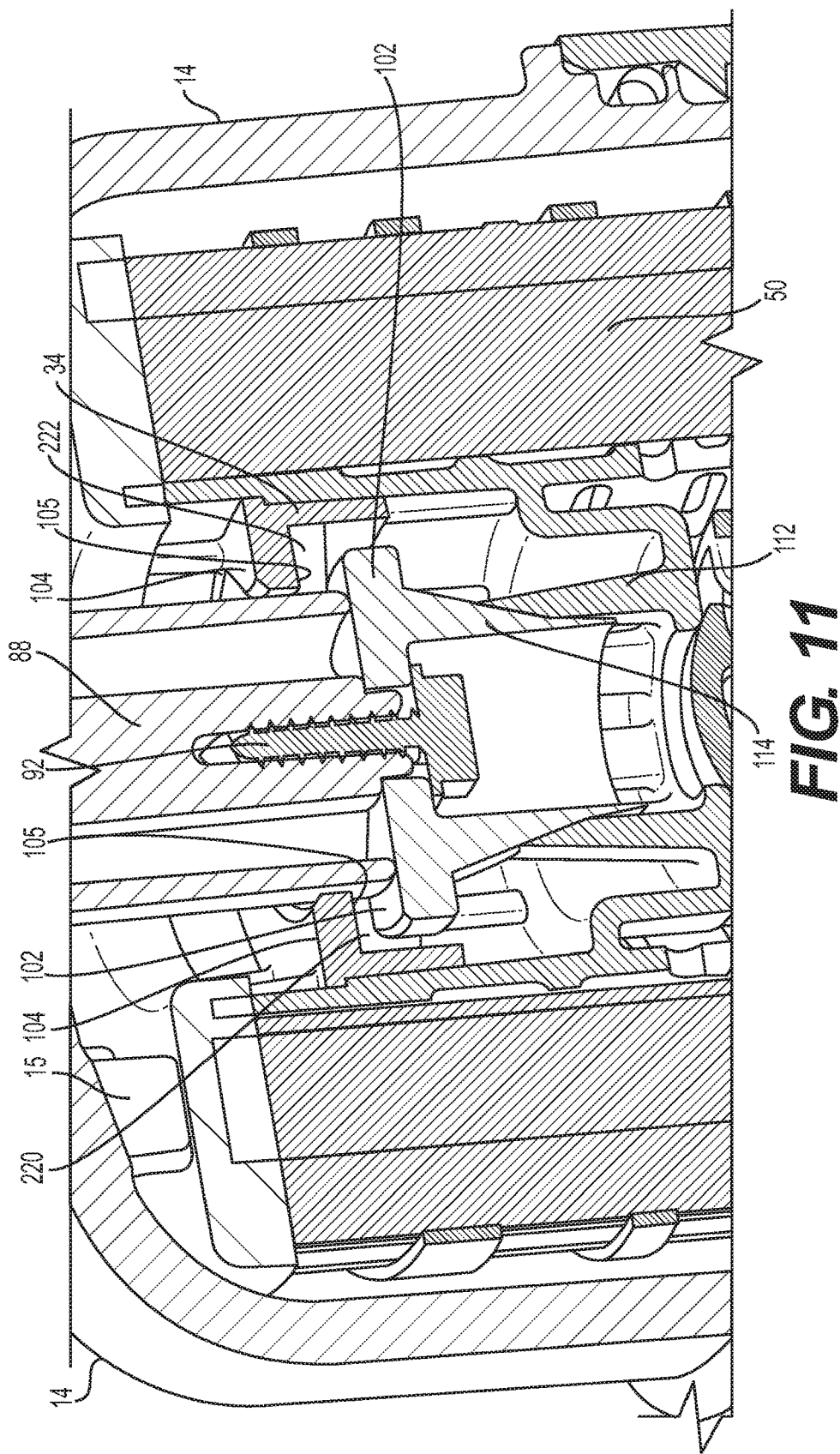
FIG. 11 is an enlarged perspective section view of the housing and filter element of FIG. 10 in a second relative position.
Figure 12:
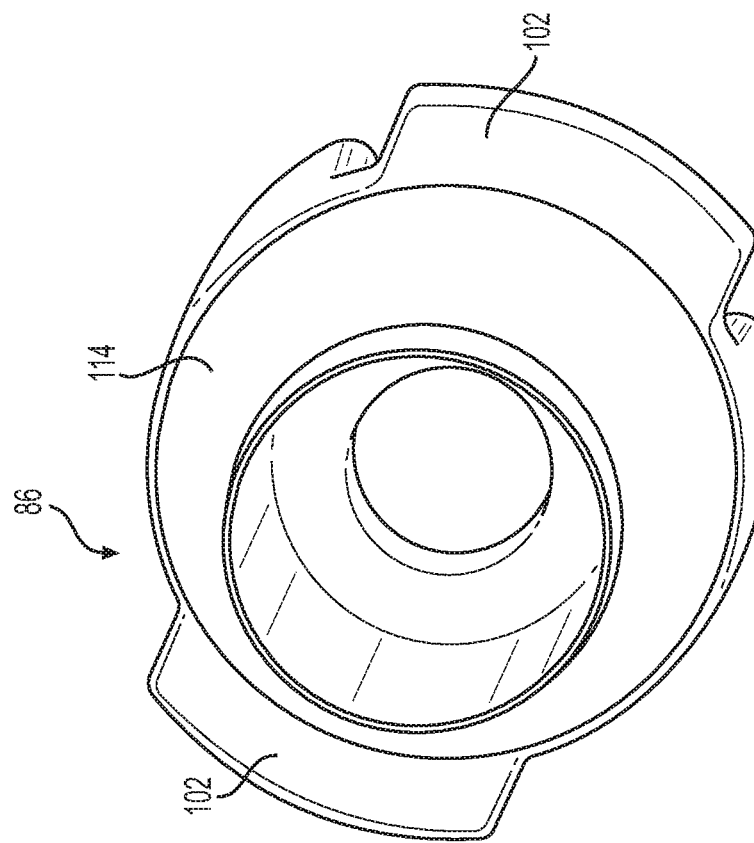
FIG. 12 is a perspective view of an exemplary coupler for the exemplary filter system of FIGS. 3-5.
Figure 13:
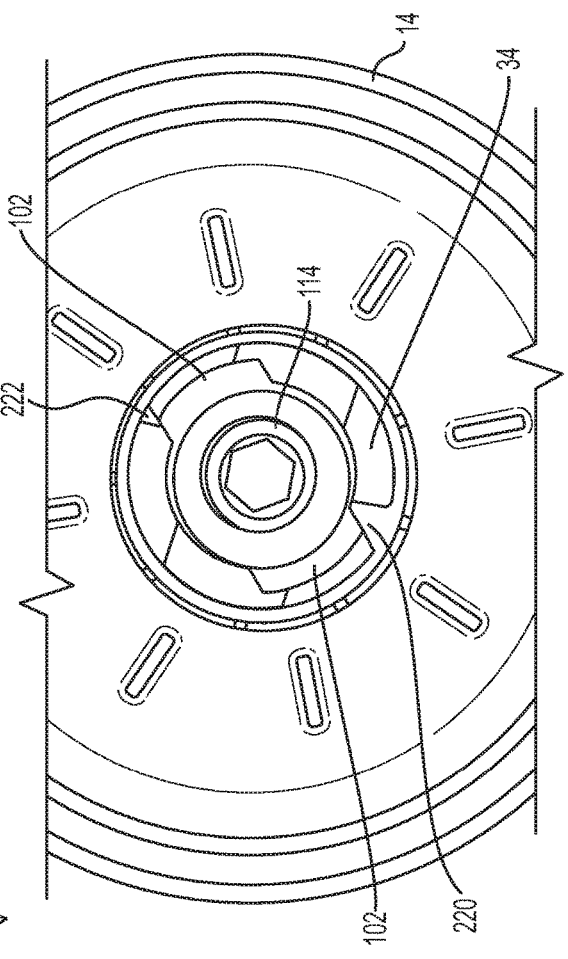
FIG. 13 is a bottom plan view of an exemplary coupler in a first position relative to a retainer element and housing of the exemplary filter system shown in FIGS. 3-5.
Figure 14:
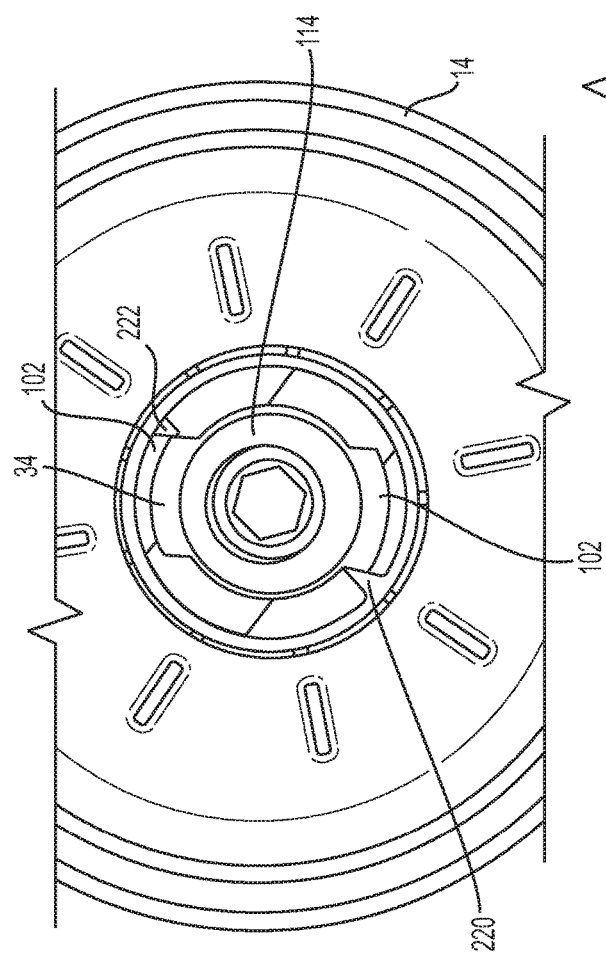
FIG. 14 is a bottom plan view of the exemplary coupler of FIG. 13 in a second position relative to a retainer element and housing of the exemplary filter system shown in FIGS. 3-5.

As shown in FIGS. 3 and 4, exemplary filter element 16 of filter system 10 is coupled to first housing 14 and received by second housing 18 to form a filter housing assembly. Filter element 16 is contained within first housing 14 and second housing 18 when first housing 14 is coupled with second housing 18. Exemplary filter element 16 includes a tubular element 26 extending along a longitudinal axis X between a first end 28 and a second end 30 and defining an internal space 32. Exemplary filter element 16 also includes a retainer element 34 positioned at a first end 28 of tubular element 26, wherein retainer element 34 is coupled to first housing 14, for example, so that first housing 14 and filter element 16 may be inserted into and removed from second housing 18 as a single piece, for example, as shown in FIG. 4. In the exemplary embodiments shown in FIGS. 3-5 the retainer element 34 may be press fit into first end 28 of tubular element 26. FIG. 8 illustrates a detailed perspective view from the bottom side of retainer element 34, wherein the "bottom" side of retainer element 34 refers to the side of retainer element 34 facing second housing 18 in the filter housing assembly.

Figure 5:
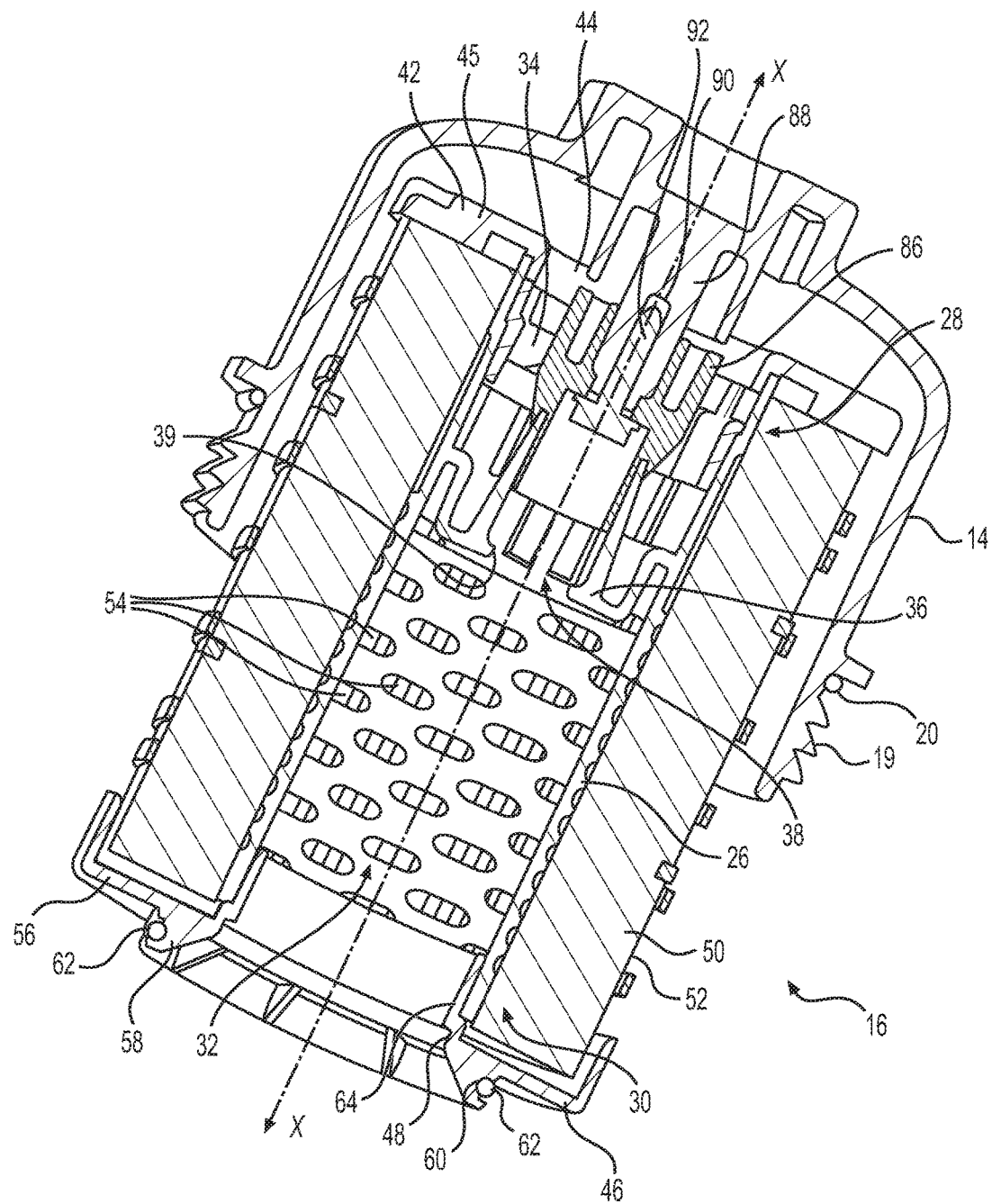
FIG. 5 is a side section view of the first housing coupled to the filter element shown in FIG. 4.

As shown in FIGS. 3-5, exemplary filter element 16 may also include a valve seat member 36 in internal space 32 defined by tubular element 26 and positioned between first end 28 and second end 30 of tubular element 26. In the exemplary embodiment shown, valve seat member 36 includes a valve seat aperture 38 configured to provide flow communication between first end 28 of tubular element 26 and second end 30 of tubular element 26. As shown in FIG. 3, valve seat aperture 38 may be configured to provide a fluid seal with a valve poppet 40, for example, as explained herein. For example, valve seat aperture 38 may be circular and may include a periphery 39 (e.g., a chamfered periphery) configured to provide the fluid seal with valve poppet 40.

Exemplary filter element 16 also includes a first end cap 42 associated with first end 28 of tubular element 26. First end cap 42 may define a first end cap opening 44 configured to provide flow communication through first end 28 of tubular element 26. For example, first end cap 42 may include an annular wall 45 orthogonal (e.g., perpendicular) with respect to longitudinal axis X of tubular element 26 and coupled to first end 28 of tubular element 26. Annular wall 45 may define first end cap opening 44. First end cap 42 may be formed from plastic, metal, and/or similar materials. In the exemplary embodiment shown, filter element 16 also includes a second end cap 46 associated with second end 30 of tubular element 26. Second end cap 46 may define a second end cap opening 48 configured to provide flow communication between internal space 32 of tubular element 26 and second housing 18. Second end cap 46 may be formed from plastic, metal, and/or similar materials.

Exemplary filter element 16 also includes filter media 50 provided around tubular element 26 and between first and second end caps 42 and 46. Filter media 50 is configured to capture contaminates in fluid passing through filter system 10. Filter media 50 may be any filter media type known to those skilled in the art, such as, for example, foam-type, screen-type, paper-type (e.g., pleated or folded filter paper-type), and combinations thereof. According to some embodiments, filter media 50 may be a coalescing-type media configured to promote separation of a first fluid from a second fluid having different characteristics than the first fluid (e.g., water from fuel), such that one of the first fluid and the second fluid coalesces into droplets as it passes through the coalescing-type media, and such that the droplets of the first fluid form on the downstream surface of the coalescing-type media. According to some embodiments, filter media 50 may be a barrier-type media configured to separate the first fluid from the second fluid before the fluid passes through the barrier-type media, such that droplets of the first fluid form on the upstream surface of the barrier-type media, and the second fluid passes through the barrier-type media. According to some embodiments, filter media 50 may include combinations of the above-mentioned media types.

In the exemplary embodiment shown in FIGS. 1-9, fluid for filtration by filter system 10 enters filter system 10 via inlet port 22 of second housing 18, which is in flow communication with the fluid system of the associated machine. Fluid entering filter system 10 via inlet port 22 flows around an exterior surface 52 of filter media 50 and passes from exterior surface 52 into filter media 50. Tubular element 26 may include a plurality of tubular element apertures 54 extending radially between an inner peripheral surface of tubular element 26 and an outer peripheral surface of tubular element 25, and configured to provide flow communication between filter media 50 and internal space 32 of tubular element 26. According to some embodiments, tubular element apertures 54 are present between valve seat member 36 and second end 30 of tubular element 26. Fluid flowing through filter media 50, thereby removes contaminates from the fluid, such as, for example, particulates and/or fluids different than the fluid being filtered. Upon flowing through filter media 50, the filtered fluid flows through tubular element apertures 54 in a radially inward direction into internal space 32. Internal space 32 is in flow communication with outlet port 23 of second housing 18, and upon flowing to outlet port 23, fluid exits filter system 10 and returns to the fluid system of the machine.

Figure 6:
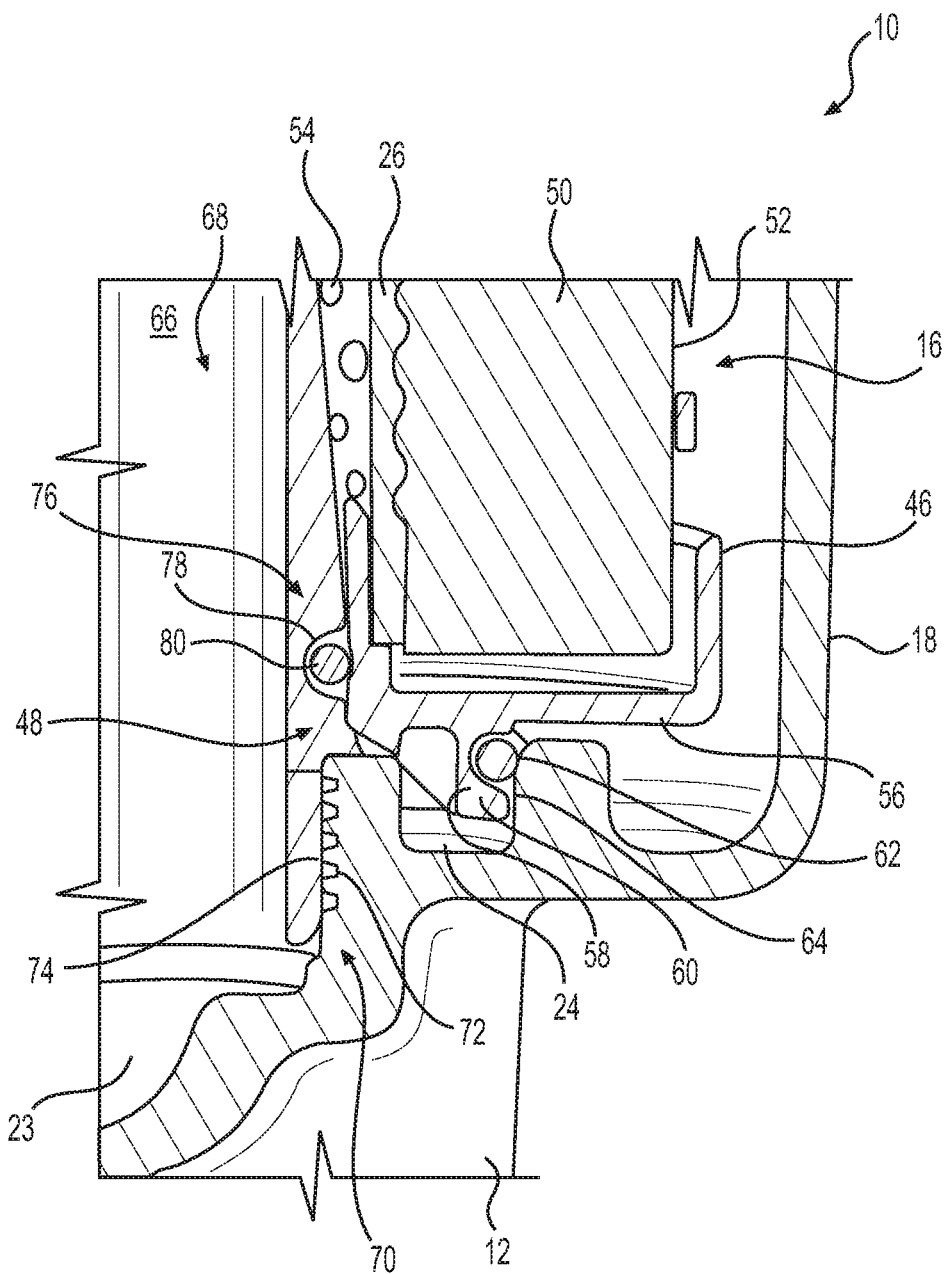
FIG. 6 is a side detail section view of a bottom portion of the exemplary filter element seated in the second housing shown in FIGS. 3 and 4.

According to some embodiments, for example, as shown in FIGS. 3 and 4, second end cap 46 may be coupled to second end 30 of tubular element 26 and filter media 50. According to some embodiments, second end cap 46 is configured to provide a fluid seal between filter element 16 and drain passage 24 in second housing 18, such that as filter element 16 is separated from second housing 18, fluid flows from filter element 16 into drain passage 24 of second housing 18. For example, as shown in FIGS. 3-5, exemplary second end cap 46 includes an annular wall 56 orthogonal (e.g., perpendicular) with respect to longitudinal axis X of tubular element 26 and an annular barrier 58 extending orthogonal (e.g., perpendicular) with respect to annular wall 56 in a direction opposite filter media 50. Exemplary annular wall 56 of second end cap 46 defines second end cap opening 48. Exemplary annular barrier 58 includes an annular recess 60, for example, facing radially outward with respect to annular barrier 58. The exemplary embodiment shown includes a seal member 62 (e.g., an O-ring seal) received in annular recess 60. As shown in FIGS. 3, 4, and 6, exemplary second housing 18 includes a radially inward facing annular seal face 64 providing a surface against which seal member 62 may abut and provide a fluid seal when filter element 16 is fully received in second housing 18. As shown in FIG. 4, as filter element 16 is withdrawn from second housing 18, seal member 62 disengages from seal face 64, thereby permitting fluid to flow from filter element 16 into drain passage 24 of second housing 18.

According to some embodiments, filter system 10 further includes a tubular guide 66 associated with (e.g., coupled to) second housing 18, such that tubular guide 66 provides flow communication between tubular element 26 and outlet port 23 via a plurality of tubular guide apertures 67 extending radially between an inner peripheral surface of tubular guide 66 and an outer peripheral surface of tubular guide 66, and configured to provide flow communication between filter media 50 and internal space 32 of tubular element 26, for example, as shown in FIG. 2. As shown in FIGS. 3 and 4, exemplary tubular guide 66 defines a passage 68 in flow communication with tubular guide apertures 67 and extending along a longitudinal axis G aligned with (e.g., co-linear with) longitudinal axis X of tubular element 26 (see FIGS. 3 and 4). Exemplary second housing 18 includes a circular recess 70 adjacent outlet port 23 configured to receive an end of tubular guide 66. For example, recess 70 may have internal threads 72 configured to engage external threads 74 on an end of tubular guide 66 adjacent outlet port 23, as shown in FIGS. 3 and 4. According to some embodiments, tubular guide 66 may be formed integrally with second housing 18 (e.g., via molding, casting, and/or machining), thereby forming a unitary structure.

According to some embodiments, tubular element 26 of filter element 16 receives at least a portion of tubular guide 66. For example, tubular guide 66 may nest within tubular element 26, as shown in FIG. 3. According to some embodiments, a fluid seal 76 is provided between tubular guide 66 and filter element 16, for example, as shown in FIGS. 4 and 6. In the exemplary embodiment shown, the radially exterior peripheral surface of an end of tubular guide 66 adjacent second end cap 46 includes a radially outward facing recess 78 and a seal member 80 (e.g., an O-ring seal) received in recess 78. In this exemplary arrangement, fluid seal 76 is provided between an inwardly facing radial surface of second end cap 18 of filter element 16 and tubular guide 66, for example, as shown in FIGS. 4 and 6. Fluid seal 76 serves to prevent fluid from flowing into tubular element 26 and/or tubular guide 66 without first flowing through filter media 50, except as noted below.

Exemplary filter system 10 further includes a bypass valve 82 associated with tubular guide 66, as shown in FIGS. 3 and 4, wherein bypass valve 82 includes valve poppet 40, which is configured move between a first position in which valve poppet 40 provides a fluid seal between valve poppet 40 and valve seat aperture 38 of valve seat member 36 (e.g., as shown in FIG. 3), and a second position in which flow communication is provided between first end 28 of tubular element 26 and outlet port 23 of second housing 18 via valve seat aperture 38 and tubular guide 66. According to some embodiments, bypass valve 82 further includes a biasing member 84 coupled to valve poppet 40 and tubular guide 66 and configured to bias valve poppet 40 against valve seat aperture 38. For example, biasing member 84 may be a helical spring (e.g., as shown) or any other type of member configured to apply a biasing force to valve poppet 40.

As shown in FIGS. 3 and 4, exemplary bypass valve 82 is configured such that when fluid pressure in first end 28 of tubular element 26 reaches a threshold pressure, valve poppet 40 moves to the second position and provides flow communication between first end 28 of tubular element 26 and outlet port 23 of second housing 18. This exemplary arrangement may be beneficial, for example, when filter media 50 provides sufficient resistance to flow between exterior surface 52 and tubular element apertures 54 to create the threshold pressure at first end 28 of tubular element 26. This resistance to flow may occur when filter media 50 has collected a sufficient amount of contaminates (e.g., trapped particulates) to inhibit flow through filter media 50. When this occurs, the force on valve poppet 40 due to the threshold pressure overcomes the biasing force of biasing member 84 and moves the valve poppet 40 to the second position, thereby opening bypass valve 82 to prevent the stoppage of fluid flow though filter system 10 and the fluid system of the machine. This may mitigate or prevent damage to the machine associated with the fluid system until filter media 50 may be serviced or replaced to restore flow through filter media 50.

According to some embodiments, filter system 10 may include a coupler 86 configured to couple filter element 16 to first housing 14. In one implementation, coupler 86 may be configured to couple filter element 16 to first housing 14 via retainer element 34, as shown in FIGS. 3-5, 7, 8, and 10-15. For example, first housing 14 may include a boss 88 configured to extend toward filter element 16 when first housing 14 and filter element 16 are assembled to one another. Boss 88 may include a receiver 90 configured to engage a fastener 92 configured to join coupler 86 to boss 88 of first housing 14. For example, receiver 90 and fastener 92 may each include cooperative threads configured to engage one another. According to some embodiments, fastener 92 may be a screw or similar fastener.

Figure 7:
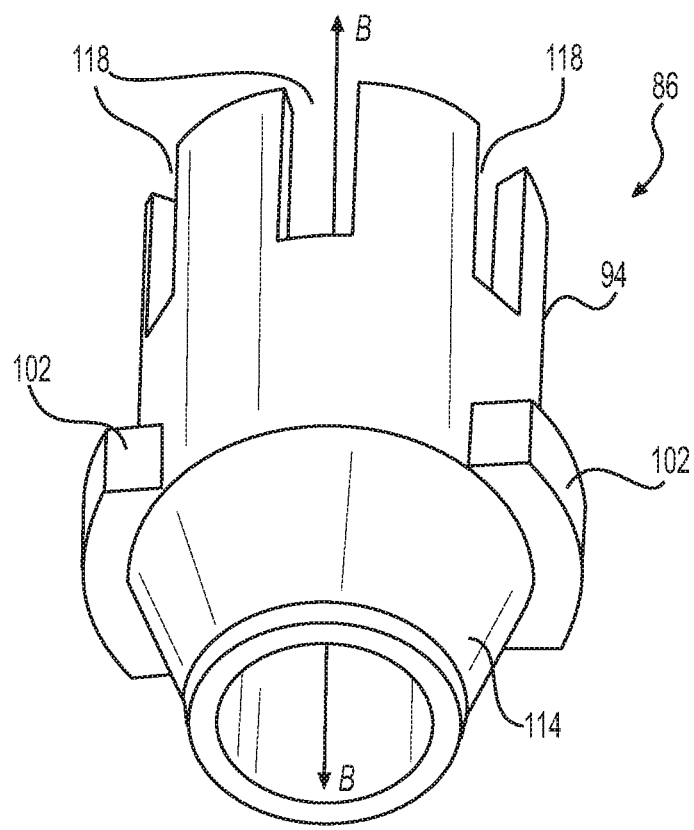
FIG. 7 is a perspective view of an exemplary embodiment of a coupler for coupling the first housing to the filter element in the exemplary filter system shown in FIGS. 3-5.

According to some embodiments, for example, as shown in FIG. 7, exemplary coupler 86 may include a tubular body 94, for example, having a circular cross-section. Tubular body 94 may extend along a longitudinal axis B, and when assembled with filter system 10, longitudinal axis B of tubular body 94 may be aligned with (e.g., co-linear with) longitudinal axis X of tubular element 26 of filter element 16, for example, as shown in FIGS. 3 and 4. Coupler 86 may also include a frustoconical end 114 and laterally extending projections 102 extending radially outward relative to longitudinal axis B adjacent the larger diameter end of frustoconical end 114. According to some embodiments, for example, as shown in FIG. 7, the end of tubular body 94 of coupler 86 opposite frustoconical end 114 may include notches 118 (e.g., castellation-like notches) for engaging boss 88 of first housing 14. For example, when coupler 86 is engaged with first housing 14, notches 118 of coupler 86 may fit around boss 88, or may intermesh with corresponding notches in boss 88.

According to some embodiments, coupler 86 and retainer element 34 are configured such that first filter housing 14 may be coupled and uncoupled from filter element 16 by rotating coupler 86 and retainer element 34 relative to one another for less than a full turn. In some exemplary embodiments, retainer element 34 may be press fit into or otherwise associated with first end 28 of tubular element 26, so rotation of coupler 86 relative to retainer element 34 is also rotation of first housing 14 relative to tubular element 26 and filter element 16. For example, as shown in FIG. 8, retainer element 34 may include a retainer aperture 96 configured to receive coupler 86. In the exemplary embodiment shown, retainer aperture 96 includes a central circular portion 98 and two opposite, laterally extending slots 100 extending radially outward from circular portion 98. As shown in FIG. 7, exemplary coupler 86 includes at least one laterally extending projection 102 (e.g., two opposing projections) extending from tubular body 94 in a direction orthogonal (e.g., perpendicular) to longitudinal axis B of tubular body 94. Laterally extending projections 102 are configured to pass through the laterally extending slots 100 of retainer aperture 96 after frustoconical end 114 of body 94 of coupler 86 passes through circular portion 98 of retainer aperture 96.

As shown in FIG. 8, retainer element 34 may include two arcuate shoulder segments 110 that define central circular portion 98 and laterally extending slots 100 of retainer aperture 96. Arcuate shoulder segments 110 may each extend between opposite sides of the two opposite laterally extending slots 100. The arcuate shoulder segments 110 also extend radially inward from an outer peripheral wall 103 of retainer element 34. Arcuate shoulder segments 110 are configured to form a barrier to axial movement of laterally extending projections 102 of coupler 86 when frustoconical end 114 and laterally extending projections 102 have been inserted through retainer aperture 96, and coupler 86 has been rotated so that projections 102 are positioned at least partially below a bottom surface 105 of arcuate shoulder segments 110. A full tab 220 may protrude radially inward from outer wall 103 of retainer element 34, and axially along a radially inward peripheral surface of outer wall 103 for a first axial distance from the bottom surface 105 of one of the two arcuate shoulder segments 110. In the exemplary embodiment shown in FIG. 8, full tab 220 may be located approximately midway between the two opposite laterally extending slots 100, although alternative embodiments may position full tab 220 at other circumferential locations along the inner peripheral surface of outer wall 103.

A partial tab 222 may protrude radially inward from outer wall 103, and extend axially along the radially inward peripheral surface of outer wall 103 for a second axial distance less than the first axial distance. Partial tab 222 may extend from the bottom surface 105 of the other of the two arcuate shoulder segments 110 approximately midway between the two opposite laterally extending slots 100 on an opposite side of the lateral slots 100 from the full tab 220. Alternative embodiments may position partial tab 222 at other circumferential locations along the inner peripheral surface of outer wall 103. As shown in FIG. 8, full tab 220 may have a triangular-shaped axial cross-section, and may extend substantially the entire axial distance from bottom surface 105 of one arcuate shoulder segment 110 to an axial end of outer peripheral wall 103 of coupler 34. Partial tab 222 may also have a triangular-shaped axial cross-section, and may extend axially from the bottom surface 105 of the other arcuate shoulder segment 110 for an axial distance that is less than the axial length of the full tab 220. The triangular-shaped cross-sections of full tab 220 and partial tab 222 may be configured such that opposite side edges of opposite laterally extending projections 102 of coupler 86 may be positioned against one face of full tab 220 and against one face of partial tab 222 such that the coupler 86 is prevented from rotating in either circumferential direction. The axial length of full tab 220 may be configured such that laterally extending projections 102 of coupler 86 cannot be moved axially past the full tab 220. Full tab 220 may therefore limit the angular range of motion of coupler 86 to less than 180 degrees. The shorter axial length of partial tab 222 permits coupler 86 and laterally extending projections 102 to be inserted far enough through retainer aperture 96 to allow the projections 102 to clear the partial tab 222. As a result, the relative dimensions and positions of coupler 86 and retainer element 34 enable rotation of coupler 86 and projections 102 past the bottom axial surface of partial tab 222, but stop rotation of coupler 86 when projections 102 contact opposite sides of full tab 220.

According to some embodiments, retainer element 34 may be associated with first end 28 of tubular element 26. Retainer element 34 may be press fit into first end 28 of tubular element 26, as shown in FIG. 8. In various alternative embodiments, retainer element 34 may be formed integrally with tubular element 26. In the exemplary embodiment shown, retainer element 34 includes arcuate shoulder segments 110 defining retainer aperture 96. Inner diameter 104 of arcuate shoulder segments 110 at least partially defines the central circular portion 98 of retainer aperture 96, and lateral slots 100 may be defined between the circumferential ends of arcuate shoulder segments 110.

During assembly according to the exemplary embodiment shown, coupler 86 may be oriented circumferentially such that laterally extending projections 102 are aligned with laterally extending slots 100 of retainer aperture 96, and the frustoconical end 114 and projections 102 of coupler 86 may be inserted through retainer aperture 96. Once coupler 86 is inserted into retainer aperture 96 by an amount sufficient for projections 102 to clear partial tab 222, coupler 86 may be rotated and re-oriented circumferentially until a laterally extending projection 102 is stopped by full tab 220. At this point the one or more projections 102 (two are shown in the exemplary embodiment of the figures) are positioned below the bottom surface 105 of arcuate shoulder segments 110. In this exemplary manner, coupler 86 and retainer element 34 are configured such that first housing 14 may be coupled and uncoupled to filter element 16 by inserting or removing frustoconical end 114 and projections 102 of coupler 86 through retainer aperture 96, and rotating coupler 86 and retainer element 34 relative to one another for less than a full turn (e.g., a quarter turn). In this exemplary manner, first housing 14 may be coupled and uncoupled from filter element 16 without the use of tools.

As shown in FIGS. 3-5 and 9, exemplary filter element 16 may include a biasing element 112 in internal space 32 of tubular element 26 and between valve seat member 36 and retainer element 34. Exemplary tubular body 94 of coupler 86 includes an exterior surface having frustoconical end 114 configured to engage biasing element 112. The outer conical surface of frustoconical end 114 may be configured to move both axially and rotationally while in contact with biasing element 112. Biasing element 112 may bias coupler 86 toward first end 28 of tubular element 26 when frustoconical end 114 of coupler 86 has passed through retainer aperture 96 by an amount sufficient for laterally extending projections 102 of tubular body 94 to also clear arcuate shoulder segments 110 of retainer element 34. Frustoconical end 114 and laterally extending projections 102 of coupler 86 may be passed through retainer aperture 96, and frustoconical end 114 may be pressed against biasing element 112 until projections 102 have moved axially past partial tab 222, at which point coupler 86 may be rotated in either direction until one of projections 102 is stopped by full tab 220. At the circumferential position of coupler 86 when an edge on one side of one laterally extending projection 102 is abutting full tab 220, the other laterally extending projection 102 may be in a position relative to partial tab 222 such that the biasing force of biasing element 112 may move coupler 86 axially toward first end 28 of tubular element 26 until laterally extending projections 102 abut against bottom surfaces 105 of arcuate shoulder segments 110. The partial tab 222 may then contact a side edge of one laterally extending projection 102 opposite from the side edge of the other projection 102 abutting full tab 220, thereby preventing coupler 86 from rotating relative to retainer element 34. With the laterally extending projections 102 engaged with the bottom surfaces 105 of arcuate shoulder segments 110, and prevented from rotating relative to retainer element 34 by full tab 220 and partial tab 222, filter element 16 is retained in first filter housing 14 as first filter housing 14 is unscrewed from second filter housing 18.

According to some embodiments, biasing element 112 may be configured to provide flow communication between first end 28 of tubular element 26 and valve seat aperture 38. For example, in the exemplary embodiments shown in FIGS. 3-5 and 9, exemplary biasing element 112 includes a plurality of flexible fingers 116 configured to contact frustoconical end 114 of tubular body 94 and bias coupler 86 toward retainer element 34, such that laterally extending projections 102 of coupler 86 abut bottom surfaces 105 of arcuate shoulder segments 110. Exemplary fingers 116 are configured to provide flow communication between first end 28 of tubular element 26 and valve seat aperture 38. This exemplary arrangement permits fluid to flow between fingers 116, through valve seat aperture 38, through tubular element 26, and into outlet port 23 when valve poppet 40 of bypass valve 82 moves to the second (open) position.

According to some embodiments, first housing 14 may be separated from filter element 16 by pushing together first housing 14 and filter element 16 to overcome biasing element 112 until a laterally extending projection 102 of coupler 86 clears partial tab 222 extending from the bottom surface 105 of one of arcuate shoulder segments 110. Once the laterally extending projection 102 has cleared partial tab 222, coupler 86 may be rotated and re-oriented circumferentially such that projections 102 are circumferentially aligned with laterally extending slots 100 of retainer aperture 96, and coupler 86 may be withdrawn from retainer aperture 96 of retainer element 34. Because coupler 86 is coupled to first housing 14, when coupler 86 is separated from retainer element 34, first housing 14 is thereby separated from filter element 16. Thereafter, a new or refurbished filter element 16 may be coupled to first housing 14, and first housing 14 and filter element 16 may be assembled to second housing 18. In this exemplary manner, first housing 14 may be separated from a used filter element 16 by circumferentially rotating first housing 14 and filter element 16 (e.g., a quarter turn) with respect to one another, and pulling apart first housing 14 and filter element 16. As a result, according to some embodiments, first housing 14 and filter element 16 may be separated from second housing 18 without handling filter element 16. Circumferential engagement of sides of laterally extending projections 102 against full tab 220 and partial tab 222 when the biasing force of biasing element 112 presses projections 102 of coupler 86 against the bottom surface 105 of arcuate shoulder segments 110 prevents rotation of coupler 86 relative to retainer element 34 during assembly and disassembly of first filter housing 14 and second housing 18.

INDUSTRIAL APPLICABILITY

The filter system of the present disclosure may be useful for filtering fluids for a variety of machines including power systems, coolant systems, hydraulic systems, and/or air handling systems. For example, a supply of fluid may be supplied to filter system 10 via a fluid conduit, filtered via filter system 10, and recirculated into the fluid system via a conduit. For example, the fluid to be filtered may enter filter system 10 via inlet port 22 in second housing 18, pass through filter media 50 of filter element 16 where contaminates are removed from the fluid, through tubular element apertures 54, through tubular guide apertures 67, into internal space 32 of tubular element 26, and exit filter system 10 via outlet port 23 in second housing 18, and return to the fluid system.

According to some embodiments, the filter housing assembly of filter system 10 may facilitate removal of filter element 16 from filter system 10 without resulting in significant spillage of the fluid from filter system 10 during removal. For example, as described in relation to the exemplary embodiments shown in FIGS. 1-14, as filter element 16 is separated from second housing 18, seal member 62 of second end cap 46 disengages from seal face 64 of second housing 18, thereby permitting fluid in filter element 16 to flow from filter element 16 into drain passage 24 of second housing 18, which returns the drained fluid to the fluid system.

According to some embodiments, first housing 14 may be selectively coupled to filter element 16, for example, as described above in relation to the exemplary embodiments shown in FIGS. 1-14. According to such embodiments, it is not necessary for a service technician removing filter element 16 from second housing 18 to soil their hands with fluid from filter system 10 because the service technician is able to remove filter element 16 by holding first housing 14 as a result of first housing 14 being coupled to filter element 16 by coupler 86. The filter element 16 includes tubular element 26, a first end cap 42, a second end cap 46, and filter media 50 provided around tubular element 26 and between first and second end caps 42 and 46. Tubular element 26 may be associated with or formed integrally with retainer element 34 and biasing element 112. In some embodiments retainer element 34 may be press fit into first end 28 of tubular element 26, and biasing element 112 may be formed integrally with or otherwise joined to tubular element 26, spaced axially toward the second end 30 of tubular element 26 from first end 28, and extending radially into the center of tubular element 26. Biasing element 112 may include axially extending flexible fingers 116 configured to engage with the outer conical surface of frustoconical end 114 of coupler 86 when frustoconical end 114 and laterally extending projections 102 of coupler 86 are passed through retainer aperture 96 of retainer element 34. Retainer aperture 96 of retainer element 34 may be defined by two arcuate shoulder segments 110 extending radially inward from outer peripheral wall 103 of retainer element 34. Central circular portion 98 of retainer aperture 96 may be configured to allow passage of frustoconical end 114 of coupler 86, and laterally extending slots 100 of retainer aperture 96 may be configured to allow passage of laterally extending projections 102 of coupler 86. Full tab 220 and partial tab 222 extending axially below bottom surface 105 of arcuate shoulder segments 110 of retainer element 34 enable selective engagement and disengagement of coupler 86 with filter element 16. The biasing force of biasing element 112 against frustoconical end 114 of coupler 86 presses laterally extending projections 102 of coupler 86 against the bottom surfaces 105 of arcuate shoulder segments 110 of retainer element 34, and full tab 220 and partial tab 222 together prevent rotation of coupler 86 relative to retainer element 34 during assembly and disassembly of first filter housing 14 and second housing 18.

After uncoupling and withdrawing first housing 14 and filter element 16 from second housing 18, first housing 14 may be separated from filter element 16 without having to handle filter element 16. The process for separating first housing 14 from filter element 16 may include supporting second end cap 46 of filter element 16 on a surface, and exerting an axial force on first housing 14 in order to press together first housing 14 and filter element 16. The axial force on first housing 14 is transferred to coupler 86, thereby overcoming the biasing force of biasing element 112 against frustoconical end 114 of coupler 86 attached to first housing 14. While maintaining the axial force on first housing 14, first housing 14 and filter element 16 may be circumferentially rotated a quarter turn with respect to one another. Pushing together first housing 14 and filter element 16 presses frustoconical end 114 of coupler 86 against axially extending flexible fingers 116 of biasing element 112, which allows movement of coupler 86 farther through retainer aperture 96 of retainer element 34. As a result of this relative axial movement between coupler 86 and retainer element 34, laterally extending projections 102 of coupler 86 are moved axially past the partial tab 222 extending from bottom surface 105 of an arcuate shoulder segment 110. Coupler 86 may then be rotated relative to retainer element 34 until laterally extending projections 102 of coupler 86 are aligned with slots 100 of retainer element 34. In this circumferential position first housing 14 and attached coupler 86 may be pulled apart from filter element 16. First housing 14 and filter element 16 may be placed in a bag or receptacle, and first housing 14 may be separated from filter element 16, for example, as described above. Thereafter, first housing 14 may be coupled to a new or refurbished filter element 16, and first housing 14 and filter element 16 may be assembled to second housing 18. In this exemplary manner, filter element 16 may be replaced without significant spillage of the fluid from filter system 10 during removal of filter element 16, and without having to handle a dirty filter element, thereby protecting the environment and resulting in ease and safety of maintenance.

It will be apparent to those skilled in the art that various modifications and variations can be made to the disclosed, exemplary filter system and filter housing assembly. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter element, comprising:
a tubular element;
first and second end caps, each associated with an opposite end of the tubular element;
filter media positioned around the tubular element and between the first and second end caps;
a biasing element joined to the tubular element; and
a retainer element positioned at a first end of the tubular element, wherein the retainer element includes:
a retainer aperture including a central circular portion and two opposite lateral slots extending from opposite sides of the central circular portion;
two arcuate shoulder segments extending between opposite sides of the two opposite lateral slots;
a full tab extending a first axial distance from a bottom surface of one of the two arcuate shoulder segments at a circumferential position in between the two opposite lateral slots; and
a partial tab extending a second axial distance less than the first axial distance from a bottom surface of the other of the two arcuate shoulder segments at a circumferential position on an opposite side of the lateral slots from the full tab.

2. The filter element of claim 1, wherein the full tab includes a triangular-shaped axial cross-section.

3. The filter element of claim 2, wherein the partial tab includes a triangular-shaped axial cross-section.

4. The filter element of claim 1, wherein the retainer element is one of press fit or integrally formed with the first end of the tubular element.

5. The filter element of claim 4, wherein each of the arcuate shoulder segments extend radially inward from an outer peripheral wall of the retainer element.

6. The filter element of claim 5, wherein the full tab protrudes radially inward from the outer peripheral wall of the retainer element, and axially along a radially inward peripheral surface of the outer wall for a first axial distance from the bottom surface of the one of the two arcuate shoulder segments.

7. The filter element of claim 6, wherein the partial tab protrudes radially inward from the outer peripheral wall of the retainer element, and axially along the radially inward peripheral surface of the outer wall for a second axial distance less than the first axial distance from the bottom surface of the other of the two arcuate shoulder segments.

8. The filter element of claim 1, wherein the biasing element is formed integrally with the tubular element, extending radially inward from an outer peripheral wall of the tubular element, and positioned toward the second end of the tubular element from the retainer element positioned at the first end of the tubular element.

9. The filter element of claim 8, wherein the biasing element includes a plurality of flexible fingers arranged in a frustoconical configuration and extending toward the retainer element.

10. A filter housing assembly, comprising:
a filter element;
a housing configured to be selectively coupled to and uncoupled from the filter element; and
a coupler joined to the housing and configured to alternately couple and uncouple the filter element with the housing by relative movement between the housing and the filter element;
the filter element comprising:
a tubular element,
first and second end caps,
filter media positioned around the tubular element and between the first and second end caps,
a biasing element joined to the tubular element, and
a retainer element positioned at a first end of the tubular element, wherein the retainer element includes:
a retainer aperture configured to receive a portion of the coupler, the retainer aperture including a central circular portion and two opposite lateral slots extending from opposite sides of the central circular portion,
two arcuate shoulder segments extending between opposite sides of the two opposite lateral slots,
a full tab extending a first axial distance from a bottom surface of one of the two arcuate shoulder segments at a circumferential position in between the two opposite lateral slots, and
a partial tab extending a second axial distance less than the first axial distance from a bottom surface of the other of the two arcuate shoulder segments at a circumferential position on an opposite side of the lateral slots from the full tab.

11. The filter housing assembly of claim 10, wherein the coupler includes a frustoconical end configured to pass through the central circular portion of the retainer aperture, and two lateral projections extending from opposite sides of the frustoconical end.

12. The filter housing assembly of claim 11, wherein the two lateral projections of the coupler are configured to pass through the two opposite lateral slots of the retainer aperture in the retainer element.

13. The filter housing assembly of claim 12, wherein the frustoconical end of the coupler is configured to engage with the biasing element when both the frustoconical end and the two lateral projections of the coupler have passed through the retainer aperture.

14. The filter housing assembly of claim 13, wherein pressing engagement of the frustoconical end of the coupler against the biasing element moves the two lateral projections of the coupler axially past the partial tab of the retainer element to allow for rotation of the coupler in either circumferential direction until a lateral projection is stopped by the full tab on the retainer element.

15. The filter housing assembly of claim 14, wherein rotation of the coupler in either direction is stopped when a side edge of one of the two lateral projections of the coupler abuts against a side of the full tab.

16. The filter housing assembly of claim 15, wherein the biasing element is configured to bias the coupler toward the retainer element and the first end of the tubular element such that the two lateral projections of the coupler abut against bottom surfaces of the arcuate shoulder segments when the one of the two lateral projections of the coupler abuts against the side of the full tab.

17. The filter housing assembly of claim 16, wherein the full tab and the partial tab are configured to prevent the coupler from rotating relative to the retainer element when the side edge of the one of the two lateral projections abuts against the side of the full tab and an edge on a side of the other of the two lateral projections abuts against a side of the partial tab.

18. The filter housing assembly of claim 13, wherein the biasing element includes a plurality of flexible fingers configured for engagement with the frustoconical end of the coupler.

19. A filter system, comprising:
a housing;
a filter element; and
a coupler configured to join the housing to the filter element, wherein:
  the filter element includes a retainer element positioned at one axial end of the filter element, and a biasing element axially spaced from the retainer element and joined to the filter element;
  the coupler including:
    a first surface configured to be moved both axially and circumferentially while in contact with the biasing element, and
    a second surface configured to be biased by the biasing element into engagement with the retainer element in a first position to enable retention of the filter element in the housing, and the second surface configured to be moved axially and circumferentially out of engagement with the retainer element to a second position at which the coupler may be released from engagement with the retainer element.

20. The filter system according to claim 19, wherein the retainer element includes:
  two arcuate shoulder segments protruding radially inward from an outer circumferential wall of the retainer element, the arcuate shoulder segments defining a retainer aperture configured to receive a first portion of the coupler including the first surface, and a second portion of the coupler including the second surface,
  a full tab extending a first axial distance from a bottom surface of one of the two arcuate shoulder segments, the full tab being configured to stop circumferential movement of the second portion of the coupler, and
  a partial tab extending a second axial distance less than the first axial distance from a bottom surface of the other of the two arcuate shoulder segments, wherein the partial tab is configured to stop circumferential movement of the second portion of the coupler when the second portion is biased by the biasing element into engagement with the retainer element, and allow axial and circumferential movement of the second portion of the coupler to the second position.

* * * * *